United States Patent
Han et al.

(10) Patent No.: US 9,798,310 B2
(45) Date of Patent: Oct. 24, 2017

(54) METHOD FOR SEARCHING CROSS-REGIONAL POWER SUPPLY AREA BASED ON CIM MODEL AND SYSTEM THEREOF

(71) Applicants: STATE GRID CORPORATION OF CHINA, Beijing (CN); JIANGSU ELECTRIC POWER COMPANY, Jiangsu (CN); JIANGSU ELECTRIC POWER COMPANY SUZHOU POWER SUPPLY COMPANY, Jiangsu (CN); BEIJING KEDONG ELECTRIC POWER CONTROL SYSTEM CO., LTD., Beijing (CN)

(72) Inventors: Bing Han, Jiangsu Province (CN); Jianguo Yao, Beijing (CN); Jiaqing Zhao, Jiangsu Province (CN); Zemei Dai, Jiangsu Province (CN); Kejun Qian, Jiangsu Province (CN); Xuewei Shang, Beijing (CN); Chunlei Xu, Jiangsu Province (CN); Lingtao Zhang, Beijing (CN); Weijin Zhuang, Beijing (CN); Lin Zhao, Beijing (CN); Yongliang Meng, Jiangsu Province (CN); Pai Sun, Beijing (CN); Yang Lv, Jiangsu Province (CN); Yan Liu, Beijing (CN)

(73) Assignees: STATE GRID CORPORATION OF CHINA, Beijing (CN); STATE GRID JIANGSU ELECTRIC POWER COMPANY, Jiangsu Province (CN); STATE GRID SUZHOU POWER SUPPLY COMPANY, Jiangsu Province (CN); CHINA ELECTRIC POWER RESEARCH INSTITUTE, Beijing (CN); BEIJING KEDONG POWER CONTROL SYSTEM CO., LTD., Beijing (CN); NARI TECHNOLOGY CO., LTD., Jiangsu Province (CN)

( * ) Notice: Subject to any disclaimer, the term of this patent is extended or adjusted under 35 U.S.C. 154(b) by 35 days.

(21) Appl. No.: 14/405,245
(22) PCT Filed: Sep. 30, 2014
(86) PCT No.: PCT/CN2014/088070
§ 371 (c)(1),
(2) Date: Dec. 3, 2014
(87) PCT Pub. No.: WO2016/000341
PCT Pub. Date: Jan. 7, 2016

(65) Prior Publication Data
US 2016/0252890 A1    Sep. 1, 2016

(30) Foreign Application Priority Data
Jul. 2, 2014    (CN) .......................... 2014 1 0312974

(51) Int. Cl.
| | | |
|---|---|---|
| G06F 7/02 | (2006.01) | |
| G06F 7/04 | (2006.01) | |
| G05B 19/048 | (2006.01) | |
| G06Q 10/06 | (2012.01) | |
| G06F 17/30 | (2006.01) | |

(52) U.S. Cl.
CPC ....... *G05B 19/048* (2013.01); *G06F 17/3033* (2013.01); *G06Q 10/06* (2013.01); *G05B 2219/2639* (2013.01); *Y02B 60/188* (2013.01)

(58) Field of Classification Search
CPC ... G06F 17/3033; H04W 72/04; H04W 72/10; G05B 19/048; G05B 2219/2639; H04L 63/1416; G08B 25/06
(Continued)

(56) References Cited

U.S. PATENT DOCUMENTS

9,317,548 B2 *    4/2016    Attaluri ............. G06F 17/30339

* cited by examiner

*Primary Examiner* — Michael J Brown
(74) *Attorney, Agent, or Firm* — WPAT, P.C., Intellectual Property Attorneys; Anthony King (57) ABSTRACT

Disclosed are a method for searching a cross-regional power supply area based on a common information model (CIM)

and a system thereof. In the method, a hash function is first created according to a size of a power grid in which a power source is located; identification numbers of all devices in the power grid are mapped to a discrete hash table according to the hash function, and a collision is solved by using separate chaining; and a hash topological graph of the power grid is formed by using the discrete hash table; and a power supply area of a designated device is searched by using the hash topological graph. According to the present invention, devices in a power supply area are located rapidly and accurately by creating a discrete hash table for all device resources, so that the amount of computation is greatly reduced, and the efficiency of searching the power supply area is significantly improved.

6 Claims, 5 Drawing Sheets

(58) Field of Classification Search
USPC .... 700/286, 295, 297; 707/1, 100, 205, 698, 707/747; 702/59, 60

See application file for complete search history.

METHOD FOR SEARCHING CROSS-REGIONAL POWER SUPPLY AREA BASED ON CIM MODEL AND SYSTEM THEREOF

BACKGROUND

Technical Field

The present invention relates to a method for searching a power supply area, particularly to a method for searching a cross-regional power supply area based on a common information model (CIM) of a power grid, and further relates to a searching system used to implement the method, and belongs to the field of dispatching automation of a power grid.

Related Art

In commonly used methods for searching a power supply area at present, a network connectivity analysis and a power grid topology analysis for network path searching are mainly based. Generally, a power grid topological graph is searched by using a depth-first search algorithm and a width-first search algorithm. The depth-first search algorithm is a non-heuristic search, requires traversal on all nodes of a topological tree, and is a blind search algorithm. The width-first search algorithm is also a blind search algorithm. Different from the depth-first algorithm, the width-first algorithm starts from a root node, and traverses nodes of a topological tree along the width of the tree; and if a target is found, the calculation ends. The method for searching a power supply area by using the width-first search algorithm or the depth-first search algorithm requires traversal on and a search for a power grid model of the whole region, and with the gradual perfection of a power grid model, the power grid has an increasingly large structure and scale, so that a search by using a traversing method is increasingly time consuming, real situations of a power range cannot be displayed in real time, and on-site guidance requirements when an urgent fault occurs cannot be met.

In the Chinese patent application with the publication No. CN103544658A, a hash function is used in a power grid topological graph, and a topology hash table corresponding to various device types is created according to types of nodes and various devices and by using a device identification as a key and a device object as a value; and a topology network of the nodes is created for all the devices according to the created topology hash table corresponding to the various device types. However, with the unification and standardization of national power grid information, in order to make a device identification number unique in a whole power distribution network and facilitate further expansion of the scale of the power grid, the device identification number is generally set to a numerical value much greater than the number of elements in the power grid, and using the device identification as a key causes a waste of a large amount of storage space. In addition, the hash function is used to map a device identification to a key value in a hash table, so that a storage location in memory can be directly accessed according to the key value.

In this process, generally, a situation in which a same key value corresponds to multiple locations in the hash table occurs, and this situation is referred to as a collision; therefore, how to deal with a collision is an indispensible step in hash mapping. However, the patent application does not involve a method for dealing with a collision.

The Chinese patent application with the publication No. CN102957206A discloses a multi-granularity offline model splicing method oriented to a smart power grid. In the splicing method, for a boundary station, intranet nodes and devices inside the boundary station are reserved based on a device granularity, and extranet nodes and devices outside the boundary station are removed; and for a non-boundary station, a station granularity is reserved or removed according to intranet and extranet characteristics; therefore, a model splicing mechanism can be perfected, and an effect of model splicing can be effectively improved.

SUMMARY

In view of the defects in the prior art, a major technical problem to be solved by the present invention is to provide a method for searching a cross-regional power supply area based on a CIM model.

Another technical problem to be solved by the present invention is to provide a system for searching a cross-regional power supply area based on a CIM model.

In order to achieve the foregoing inventive objectives, the present invention uses the following technical solutions:

A method for searching a cross-regional power supply area based on a CIM model includes the following steps:

A1. creating a hash function according to a size of a power grid in which a power source is located;

A2. mapping identification numbers of all devices in the power grid to a discrete hash table according to the hash function, and forming a hash topological graph of the power grid by using the discrete hash table; and A3. searching a power supply area of a designated device by using the hash topological graph.

Preferably, in step A1, a power supply region is divided according to a voltage of the power source, so as to remove a non-power supply high-voltage region.

Preferably, in step A2, a corresponding device object is directly accessed by using a key value in the discrete hash table.

Preferably, when one key value in the discrete hash table corresponds to multiple device objects, that is, when a collision occurs, the collision is solved by using a separate chaining method.

Preferably, in step A3, when the power supply area crosses different power supply regions, cross-regional models are spliced to form a new power supply area, and the new power supply area is highlighted.

Preferably, the splicing cross-regional models to form a new power supply area includes the following steps:

C1. uploading an extranet CIM model file and a Scalable Vector Graphics (SVG) graphic file of the power supply region to a power supply intranet through a network;

C2. verifying and analyzing model files participating in the splicing, and executing the following operations: model verification, boundary aegis, an analysis of internal and external stations, and a model increment analysis;

C3. decomposing a model in the power supply area into multiple small power grid models, so as to complete classification of models; and C4. classifying model files from multiple dispatching source ends according to voltage levels or regions, performing fusion processing on model boundaries, replacing an intranet equivalent end, and associating a power grid database, so as to finally form a complete power supply network diagram.

A system for searching a cross-regional power supply area based on a CIM model is used to implement the method for searching a cross-regional power supply area, and includes:

a hash function generating module, used to create a hash function according to a size of a power grid in which a power source is located;

a discrete hash table generating module, used to map identification numbers of all devices in the power grid to a discrete hash table according to the hash function;

a module for generating a hash topological graph, used to form a hash topological graph of the power grid according to the discrete hash table; and a power supply area search module, used to search a power supply area of a designated device by using the hash topological graph, where the hash function generating module is connected to the discrete hash table generating module, and the module for generating a hash topological graph is connected to the discrete hash table generating module, and is further connected to the power supply area search module.

According to the present invention, power supply paths of all levels of power supplies are sorted out according to a power grid topology, so that a "full-chain" power grid monitoring requirement is met, and reliable power supply for important users is ensured to the greatest extent; and moreover, it is conducive to making a rapid response to a site of accident, and is convenient for on-site guidance.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The following further describes the technical content of the present invention in detail with reference to the accompanying drawings and specific embodiments.

Figure 1:
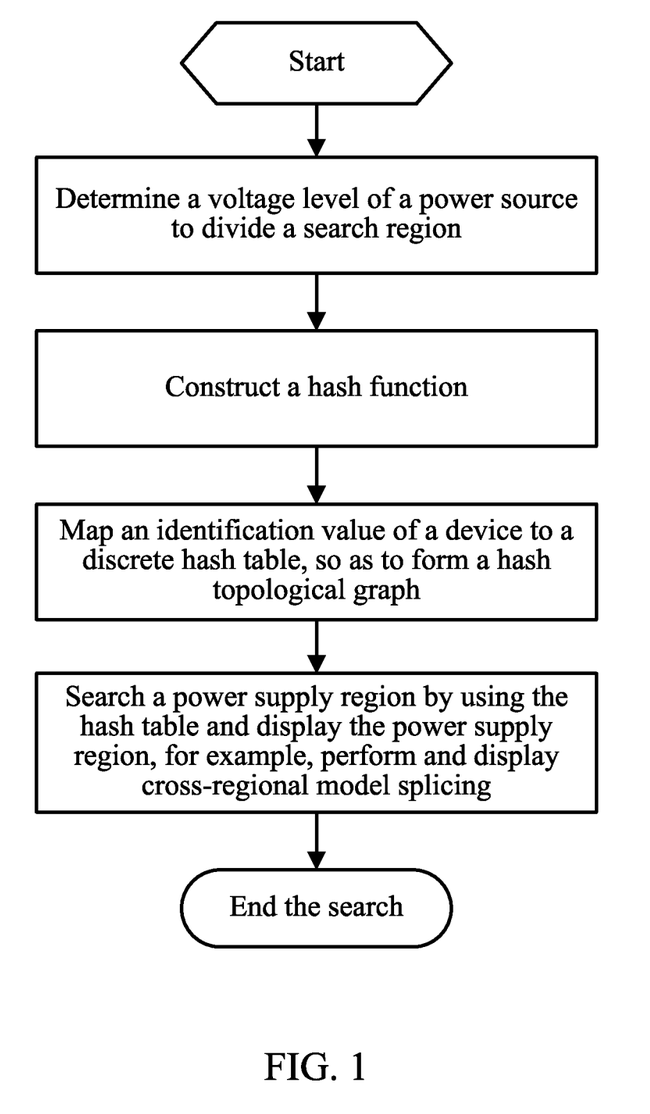
FIG. 1 is a flowchart of a method for searching a cross-regional power supply area according to the present invention.

The present invention provides a method for searching a cross-regional power supply area based on a CIM mode. As shown in FIG. 1, in the method, a power supply region is divided according to a voltage of a power source, so as to remove a non-power supply high-voltage region. A hash function is then constructed, a discrete hash table of the power supply region is generated by using the hash function, a rapid search is performed according to the discrete hash table, and the found power supply region is highlighted. If the power supply area involves multiple regions, power supply grids of the multiple regions are spliced based on a CIM and SVG, for display.

Therefore, the method for searching a cross-regional power supply area provided by the present invention includes the following steps:

A1. Create a suitable hash function according to a size of a power grid in which a power source is located.

First, an identification number of a device is used as a mapped object of the device. A suitable hash function is constructed according to a size of a power supply area, and a rule for construction is that as few hash table collisions as possible are generated after mapping.

All devices in the power grid are classified according to voltage levels, and all devices and nodes in a power grid model of a whole power supply region are numbered according to a unified numbering rule, so as to ensure that the devices and the nodes are unique without any confusion. Information such as a region number of the device, a voltage type record number and a station number is integrated with the identification number according to a preset rule, so as to construct a suitable hash function. Therefore, such processing is conducive to classification of all the devices, and is also conducive to rapid location of devices in the same power supply area.

The identification number of the device is mapped to a discrete hash table by using the hash function. For example, identification numbers of a group of power grid device are, for example, an array X, each number is a long integer number, a hash function is constructed according to the device number array, and the array X is mapped to a discrete hash table Y with limited numbers, the identification number of the device is replaced with a storage location, and after mapping, Y may be used to replace X, which greatly reduces search complexity. When a collision occurs in the mapping process, that is, when one key value corresponds to multiple devices, the collision is solved by using a separate chaining method. The number of key values of the discrete hash table must be more than the number of devices. When the number of devices is fixed, there will be left a part of space of the discrete hash table, and key values of this empty space will be set null value. In other words, empty space in the discrete hash table indicates that no device corresponds thereto.

Figure 2:
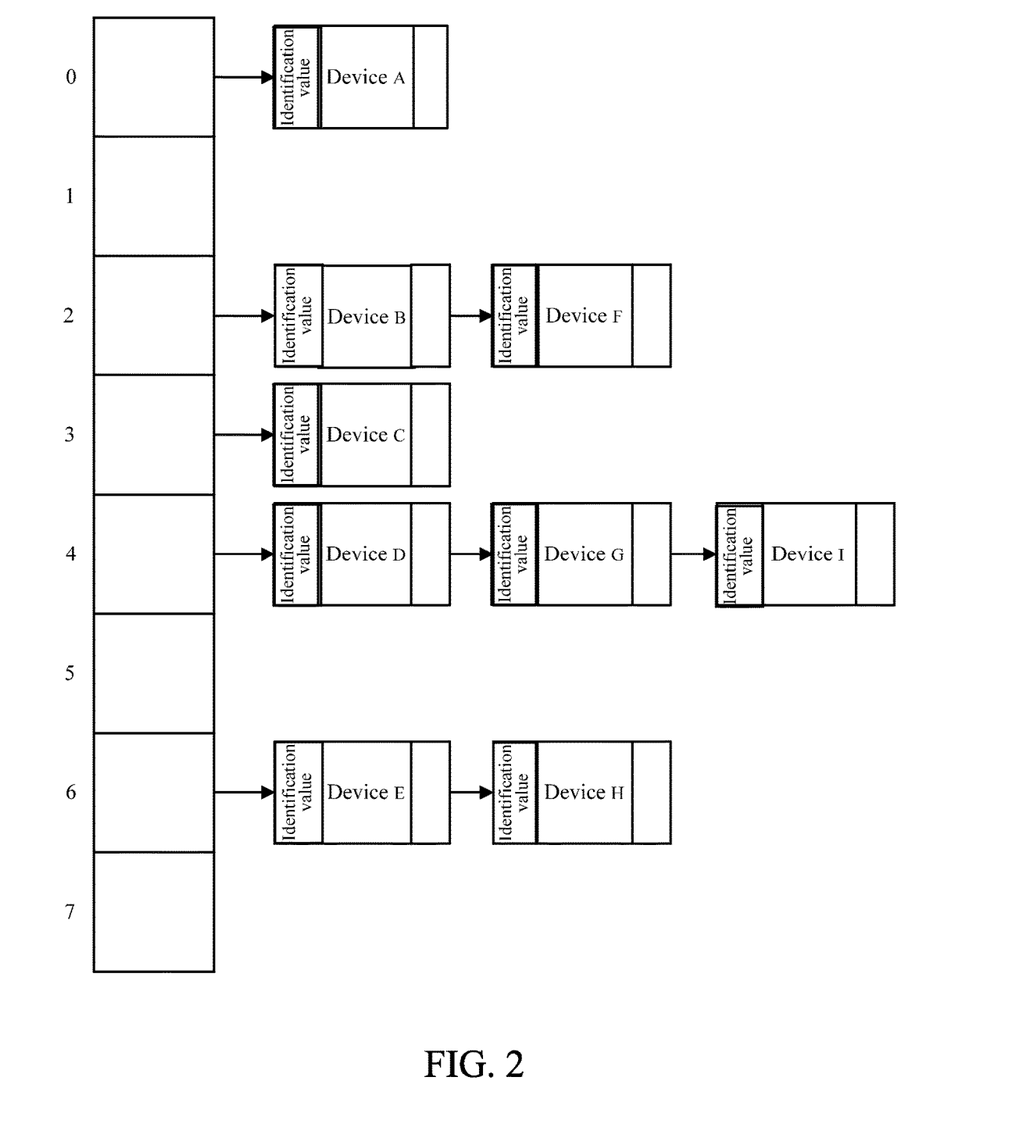
FIG. 2 is a schematic diagram of mapping to and generating a discrete hash table of a power grid device according to the present invention.

Storage space shown in FIG. 2 is a part of the discrete hash table. Numerical values 0 to 7 are a part of key values in the discrete hash table, and the identification number of the power grid device is mapped to the discrete hash table by using the hash function, so as to establish a correspondence between the identification number and the key value, where the hash function is constructed so that as few collisions as possible are generated. When a collision occurs, that is, when one key value corresponds to multiple devices, for example, a device B and a device F in the figure both correspond to the key value 2, the collision is solved by using a separate chaining method, that is, devices with a same key value are stored in a chain table with a key value of 2 in order. When a collision occurs in multiple devices, for example, when devices D, G and I are all mapped to the key value 4, the devices D, G and I are all stored in a chain table in the address. For example, a group of devices have numbers of, for example, an array A[1000033431, 10000435327, 2000065343, 20000232354, 100007454403], and certainly, a device number of an actual power supply area is much greater than the number, and device numbers are all large. In this case, a hash function is constructed according to the device number array, and the array A is mapped to the hash table, for example, it is defined that (A %10, divided by 10 to obtain a remainder) is used as a hash function, after the array is calculated, B[1, 7, 3, 4, 3] is obtained, and in a power grid device processed by using the hash function, B may be used to replace A, which greatly reduces the search complexity. It can be seen that, there are two 3s in the array B, and this is a collision. A method for solving the collision is linking a subsequent 3 sequentially by using separate chaining at the location of 3, which is conducive to a future search. A standard of a good hash function is generating as few collisions as possible.

A2. Create a discrete hash table of all the devices in the power grid according to the hash function constructed in step A1; map devices in a region to the discrete hash table by using the hash function, so as to create a discrete hash table of the devices, and a device object can be directly accessed by using a key value in the discrete hash table; and when one key value in the hash table corresponds to multiple device objects, that is, when a collision occurs, solve the collision by using a separate chaining method, and create a hash topological graph of the power grid by using the obtained discrete hash table in combination of geographic information system (GIS) information.

The key values in the discrete hash table are made to correspond to all the devices in the power grid.

A3. Search a power supply area of a designated device rapidly according to the discrete hash table in step A2, and search the discrete hash table for a corresponding node according to a set switch point and a device identification; access nodes in a topology network from near to far by using the corresponding node as a start point, until all the nodes are traversed; and combine path stacks set to accessed and whose power supply points cannot be found, and highlight the combined path stacks, so as to obtain a power supply area, and highlight the power supply area.

Figure 3:
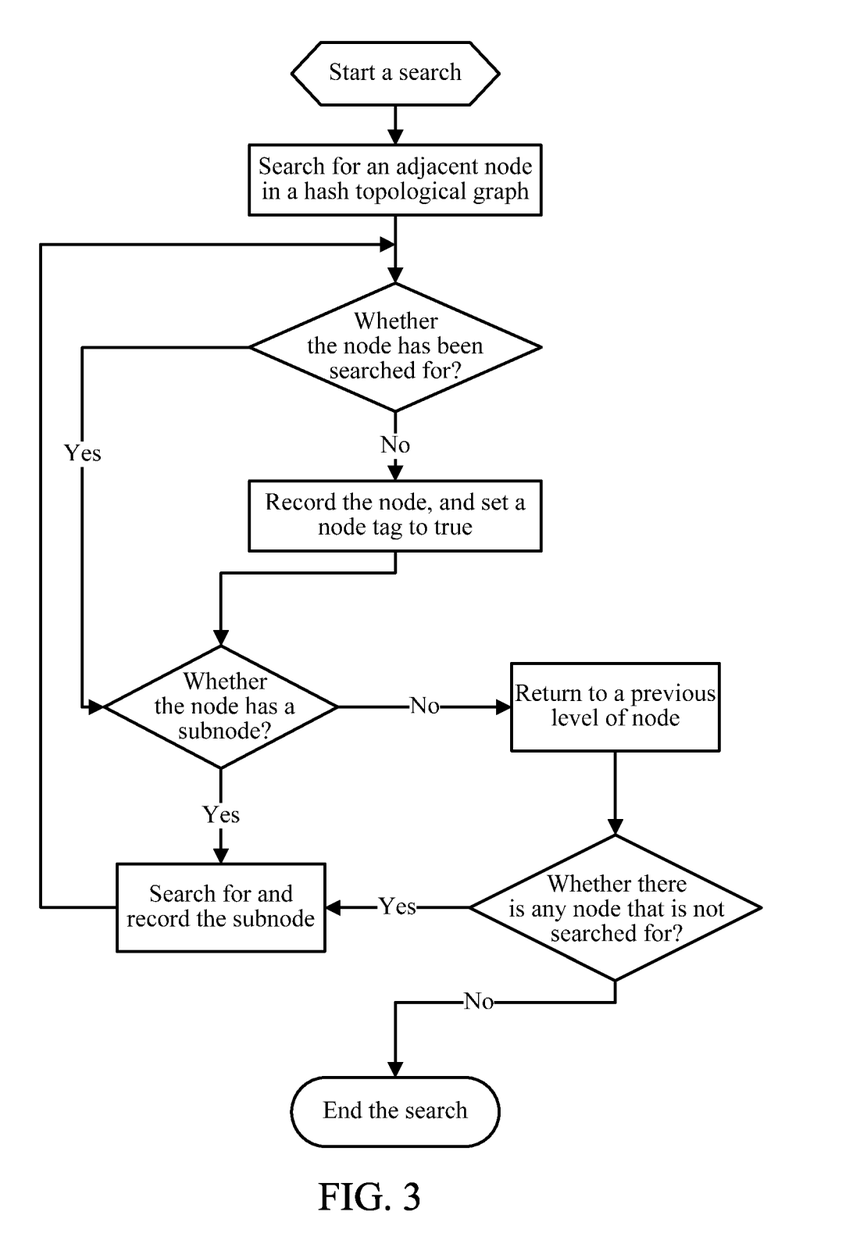
FIG. 3 is a flowchart of a method for searching a hash topology according to the present invention.

FIG. 3 shows a specific process of a method for searching a hash topology, including the following steps:

After a search is started, a key value of a designated power supply device is calculated by using a hash function, and a device with the same key value is searched for in a topological graph. A topology associated device is searched for in a hash topological graph by using the key value, and then, it is determined whether the device node has been searched for. If the device node has not been searched for, the node is recorded, a tag value of the device is set to true, and it is further determined whether the node has a subnode; and if the node has been searched for, it is directly determined whether the node has a subnode. If the node has a subnode, the subnode is searched for and included in the hash topological graph of the power supply area, and a new round of search is performed from the start point; and if the node does not have a subnode, a previous level of node is returned to, and it is determined whether there is any node that is not searched for, if there is no node that is not searched for, the search ends; and if there is a node that is not searched for, the node is searched for and recorded, and a new round of search is performed from the start point. All related elements in the hash topological graph are traversed, so as to obtain the whole power supply area. Finally, the found power supply area is highlighted.

When the power supply area is tracked by using the discrete hash table, the following principles need to be followed to ensure the accuracy of the search:

1) When a related device is found in the hash topological graph, a voltage attribute of the device is determined, and the power supply area cannot be expanded from a low-voltage side of a transformer to a high-voltage side, that is, when the low-voltage side of the transformer is found in the search process, it may be considered that a power source is found, and it is unnecessary to continue the search.

2) When a transformer device is found in a topology, if a device connected to a low-voltage side of a transformer is only powered by the transformer, the device is within a power supply area of the transformer.

3) If a device connected to a low-voltage side of a transformer found in a topology is powered by multiple transformers, a direction of tide of the device needs to be checked.

4) When a device in a station is powered by multiple power sources, whether the device is within the power supply area, a direction of tide of the related device needs to be checked.

Figure 4:
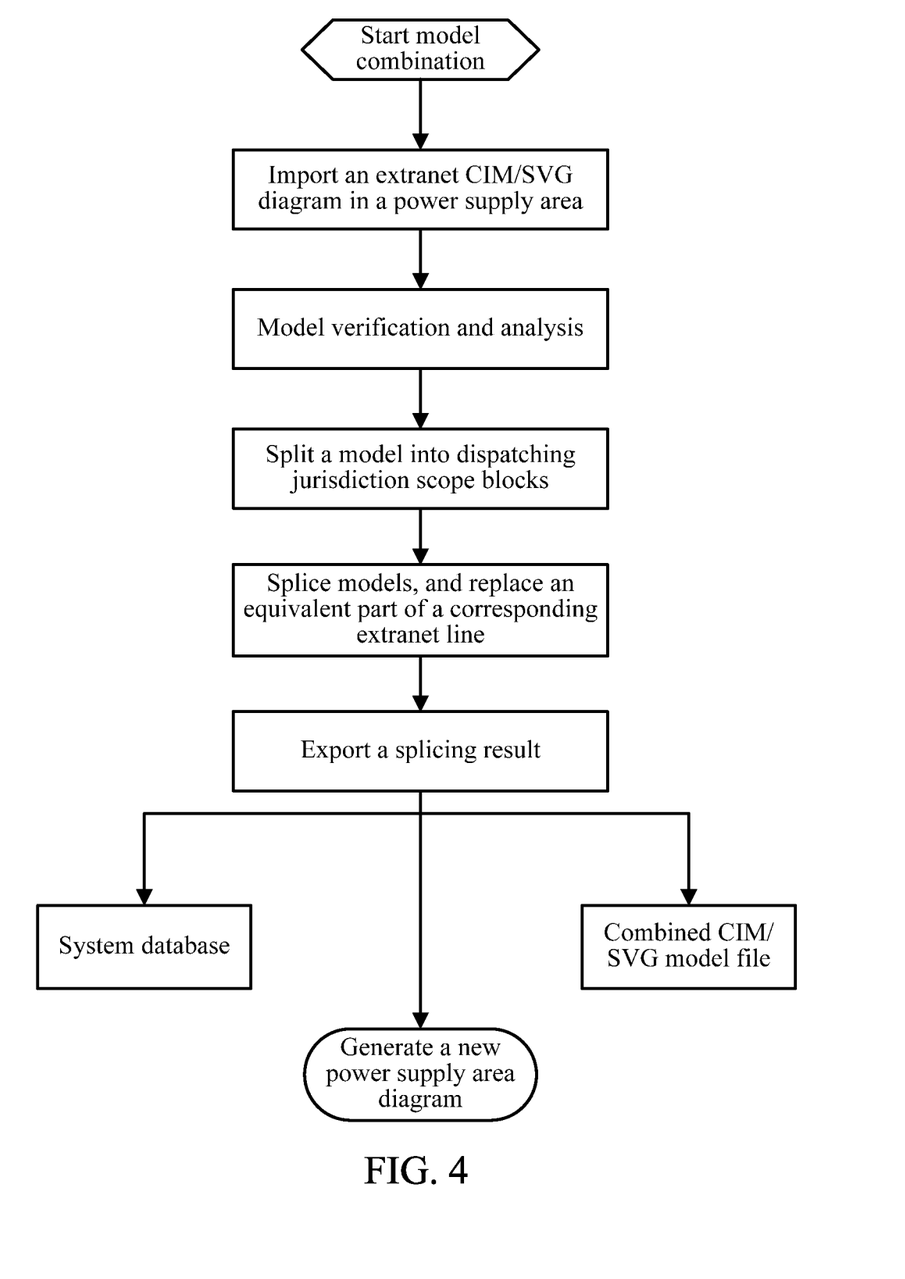
FIG. 4 is a schematic diagram of a method for splicing models according to the present invention.

When the power supply region is searched by using the discrete hash table, when a case of cross-region occurs, model splicing further needs to be performed. Therefore, the present invention further provides a method for splicing cross-regional models for a power supply area based on a CIM and SVG, and as shown in FIG. 4, the method includes the following steps:

B1. Upload an extranet CIM model file and an SVG graphic file of a power supply region to a power supply intranet through a network. The uploaded file is a power supply area model searched for in the previous step; if the power supply area crosses multiple regions, models need to be uploaded one by one; and the intranet involved in the present invention refers to that a station in which a designated power source is located is the intranet, and other stations are extranets.

B2. Verify and analyze model files participating in the splicing, and execute the following operations: model verification, boundary aegis, an analysis of internal and external stations, and a model increment analysis. The verification and the analysis aim to ensure the quality of the participating models, ensure the correctness and the consistency of all information, and provide a correct data source for subsequent model splicing, and are unified and standardized processing on the spliced models.

B3. Split a model: for an external power grid in the power supply area, decompose a model in the power supply area into multiple small power grid models, that is, electrical topological islands, according to a rule such as a designated voltage level, a same station, or a group of specific devices, so as to complete classification of the models, and facilitate subsequent splicing. In the split models, overlapped information needs to have consistent identifications, and names of overlapped parts in the existing hash topological graph should keep consistent, so as to facilitate subsequent splicing.

B4. Classify model files from extranet stations according to voltage levels or regions, perform fusion processing on model boundaries, replace an intranet equivalent end, and associate a power grid database, so as to finally form a complete power supply network diagram.

Figure 5:
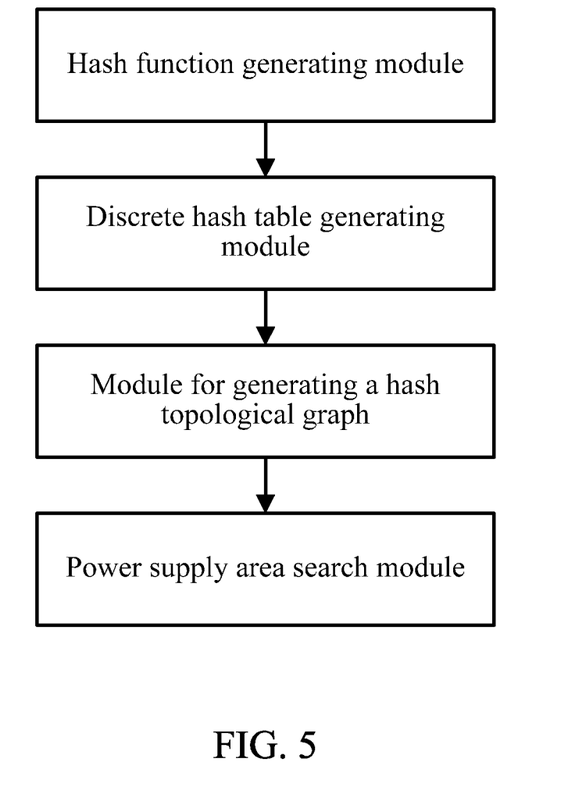
FIG. 5 is a schematic diagram of a system for searching a cross-regional power supply area according to the present invention.

As shown in FIG. 5, the present invention further provides a system for searching a cross-regional power supply area based on a CIM model, which is used to implement the method for searching a cross-regional power supply area, and includes:

a hash function generating module, used to create a hash function according to a size of a power grid in which a power source is located;

a discrete hash table generating module, used to map identification numbers of all devices in the power grid to a discrete hash table according to the hash function;

a module for generating a hash topological graph, used to form a hash topological graph of the power grid according to the discrete hash table; and a power supply area search module, used to search a power supply area of a designated device by using the hash topological graph, where the hash function generating module is connected to the discrete hash table generating module, and the module for generating a hash topological graph is connected to the discrete hash table generating module, and is further connected to the power supply area search module; a power supply element that needs to be searched for is designated, and the hash table generating module divides the power supply region according to a voltage of the power supply element, so as to remove a non-power supply high-voltage region, and constructs the hash function by using an identification number of a device as a mapping value; the discrete hash table generating module maps the device in the region to the discrete hash table according to the constructed hash function; when a collision occurs, the collision is solved by using a separate chaining method; the module for generating a hash topological graph forms the hash topological graph of the power grid in a separate chaining manner according to the discrete hash table; and the power supply area search module rapidly searches for the designated power supply element according to the hash topological graph, so as to obtain a power supply area thereof, and when the power supply area covers multiple stations, the power supply area search module may perform a cross-regional search, splice the found power supply regions, and highlight the power supply regions.

In the system for searching a cross-regional power supply area, the performing, by the power supply area search module, a cross-regional search and splicing includes the following steps:

C1. Upload an extranet CIM model file and an SVG graphic file of the power supply region to a power supply intranet through a network. The uploaded file is a power supply area model searched for in the previous step; if the power supply area crosses multiple regions, models need to be uploaded one by one; and the intranet involved in the present invention refers to that a station in which a designated power source is located is the intranet, and other stations are extranets.

C2. Verify and analyze model files participating in the splicing, and execute the following operations: model verification, boundary aegis, an analysis of internal and external stations, and a model increment analysis. The model verification mainly includes: grammar correctness of various files; the correctness of a network topology and parameters; the consistency of graphic files and model files and the like. The content of the model verification may be configured as required. The boundary aegis is an important link of model combination, and intelligent boundary aegis simplifies the process of model boundary aegis. The analysis of intranet and extranet stations refers to setting boundary features of stations based on boundary definitions obtained through a manual search or an intelligent search. The boundary features refer to that stations including conductive devices in the model file all have boundary features. A station having a boundary device is referred to as a boundary station; a station inside the boundary station is referred to as an intranet station; and other stations are generally referred to as extranet stations. A result of the model increment analysis is provided by means of a CIM model increment file, so that a user has some expectation for model change before model splicing. The verification and the analysis aim to ensure the quality of the participating models, ensure the correctness and the consistency of all information, provide a correct data source for subsequent model splicing, provide previous understanding on model change, provide reference for the user to determine whether a new model participates in the splicing, and are unified and standardized processing on the spliced models.

The boundary aegis is an important link of model combination. A dispatching boundary between network dispatching and provincial dispatching is generally at an interconnection line between stations, and a dispatching boundary between provincial dispatching and regional dispatching is generally divided inside a station. In view of the problem of complexity and large workload of the boundary aegis, the present invention uses a boundary self-detection technology in a model special dimension on the basis of an analysis on boundary features of network, provincial and regional dispatching models. The boundary self-detection technology considers three boundary aegis manners: 1. designating a boundary voltage level, and automatically detecting a transformer boundary; 2. designating a boundary station, and semi-automatically detecting a line boundary; and 3. a function of self-defining a boundary of any type. The three boundary aegis manners cooperate with each other to meet various boundary aegis requirements of offline model splicing.

C3. Split a model: for an external power grid in the power supply area, decompose a model in the power supply area into multiple small power grid models, that is, electrical topological islands, according to a certain rule such as a designated voltage level, a same station, or a group of specific devices, so as to complete classification of the models, and facilitate subsequent splicing. In the split models, overlapped information needs to have consistent identifications, and names of overlapped parts in the existing hash topological graph should keep consistent, so as to facilitate subsequent splicing.

C4. Classify model files from extranet stations according to voltage levels or regions, perform fusion processing on model boundaries, replace an intranet equivalent end, and associate a power grid database, so as to finally form a complete power supply network diagram.

Compared with the prior art, according to the present invention, by creating a discrete hash table for all device resources, devices in a power supply area are located rapidly and accurately, so that a rapid search on the power supply area is effectively implemented, and the problem of scale expansion of an associated matrix is solved; moreover, the amount of computation is greatly reduced, and the efficiency of searching the power supply area is improved. Moreover, the power supply area is highlighted, which is clear, visual, and understandable. Therefore, a powerful technical support is provided for applications such as accident traceback or evaluation on the reach of a power grid accident.

The method for searching a cross-regional power supply area based on a CIM mode and the system thereof provided by the present invention are described in detail above. Any obvious modification made by a person skilled in the art without departing from the essence and the spirit of the present invention constitutes infringement on patent rights of the present invention, and corresponding legal liabilities should be taken.

What is claimed is:

1. A system for searching a cross-regional power supply area based on a common information model (CIM), comprising:
   a hash function generating module, used to create a hash function according to a size of a power grid in which a power source is located;

a discrete hash table generating module, used to map identification numbers of all devices in the power grid to a discrete hash table according to the hash function;

a module for generating a hash topological graph, used to form a hash topological graph of the power grid according to the discrete hash table; and a power supply area search module, used to search a power supply area of a designated device by using the hash topological graph, wherein the hash function generating module is connected to the discrete hash table generating module, and the module for generating a hash topological graph is connected to the discrete hash table generating module, and is further connected to the power supply area search module.

2. The system for searching a cross-regional power supply area based on a CIM according to claim 1, wherein when the power supply area covers multiple stations, the power supply area search module performs a cross-regional search, and splices the found power supply regions to form a new power supply area.

3. The system for searching a cross-regional power supply area based on a CIM according to claim 2, wherein the new power supply area is highlighted by the power supply area search module.

4. The system for searching a cross-regional power supply area based on a CIM according to claim 1, wherein a power supply region is divided by the hash function generating module according to a voltage of the power source, so as to remove a non-power supply high-voltage region.

5. The system for searching a cross-regional power supply area based on a CIM according to claim 1, wherein a corresponding device object is directly accessed by the discrete hash table generating module using a key value in the discrete hash table.

6. The system for searching a cross-regional power supply area based on a CIM according to claim 5, wherein when one key value in the discrete hash table corresponds to multiple device objects, a collision is solved by a discrete hash table generating module using a separate chaining method.

* * * * *